No. 861,659. PATENTED JULY 30, 1907.
E. F. JOHNSTON.
FLEXIBLE SHAFTING.
APPLICATION FILED OCT. 3, 1906.

Inventor
Edgar F. Johnston

Witnesses

UNITED STATES PATENT OFFICE.

EDGAR F. JOHNSTON, OF SCHELLSBURG, PENNSYLVANIA.

FLEXIBLE SHAFTING.

No. 861,659.  Specification of Letters Patent.  Patented July 30, 1907.

Application filed October 3, 1906. Serial No. 337,203.

*To all whom it may concern:*

Be it known that I, EDGAR F. JOHNSTON, a citizen of the United States, residing at Schellsburg, in the county of Bedford and State of Pennsylvania, have invented certain new and useful Improvements in Flexible Shafting, of which the following is a specification.

This invention relates to flexible shafting and has in view the provision of a simple and practical shafting of this character embodying a maximum degree of flexibility, while at the same time preserving the requisite strength to adapt the same for the various uses to which flexible shafting is applied.

To this end the invention has in view a simple and practical construction of shafting wherein the various links or units constituting the same are hinged together in a manner to maintain a maximum strength by an even distribution of the torsional strain imposed upon the various hinge-joints while at the same time admitting of a wide range of flexibility to adapt the shafting to varying conditions. Also, the invention contemplates a construction of flexible shafting wherein the individual elements or units are held against displacement.

The general object of the invention is to provide a cylindrical shaft or shafting embodying a maximum strength and flexibility.

With these and many other objects in view, which will more readily appear as the nature of the invention is better understood, the same consists in the novel construction, combination and arrangement of parts hereinafter more fully described, illustrated and claimed.

Figure 1:
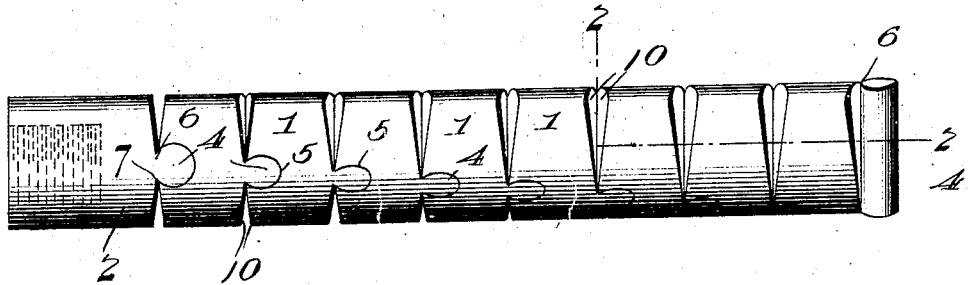
Figure 2:
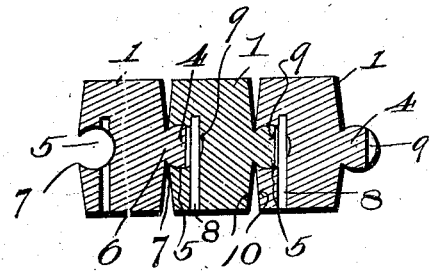
Figure 3:
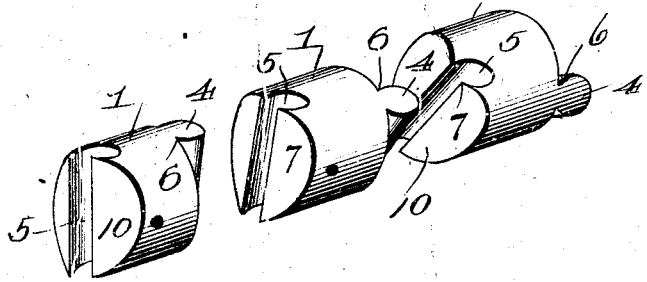

The essential feature of the invention involved in the construction of the individual links or units in the manner of hinging the same together, is necessarily susceptible to structural change without departing from the scope of the invention, but a preferred embodiment thereof is shown in the accompanying drawings, in which:

Figure 1 is a plan view of a section of flexible shafting constructed in accordance with the present invention. Fig. 2 is an enlarged sectional view on the line 2—2 of Fig. 1. Fig. 3 is a perspective view of a plurality of adjacent links or units and their fittings, the view illustrating the same separated and showing the relatively different angles of the successive hinge joints.

Like references designate corresponding parts in the several figures of the drawings.

The improved shafting contemplated by the present invention is preferably of a cylindrical form throughout, and is made up of a continuous series of similar links or units 1. These links or units 1 are made of metal or other suitable material preferably cast into proper form, and all alike with the exception of the terminal units or sections 2 which are necessarily variously shaped to adapt the same for attachment to the machine or tool to which, or from which, the shafting conveys power.

Referring to the detailed construction of the links or units 1, it will be observed that each of the same consists of a short cylindrical block provided at one side with an integral or otherwise rigidly formed transverse cylindrical knuckle-rib 4, and at its directly opposite side with a similarly shaped hinge groove 5, both said rib 4 and groove 5, at opposite sides of the same link block or body, being formed with contracted necks 6 and 7, respectively, whereby, when the knuckle-rib 4 of one link or unit is loosely engaged with the groove 5 of the adjacent link or unit, having been inserted endwise, the said adjacent links or units are tightly interlocked and prevented from pulling apart, while at the same time permitting a perfectly free rocking movement.

In order to prevent endwise displacement of the individual knuckle-ribs, each link block or section 1 has fitted therein a transverse retaining pin 8 which passes through a centrally arranged keeper notch 9 formed centrally and transversely of the rib held in the groove 5 of the said link block. The said keeper notch 9 is of such depth as to not interfere in the least with the action of the hinge-joint in permitting a relative rocking movement of the parts.

In addition to the features described, each link block or body 1 is provided upon both sides with beveled clearance faces 10 inclining both ways from the longitudinal planes of the ribs 4 and the grooves 5. By reason of these double beveled faces 10 upon the contiguous sides of the hingedly connected links or units 1, a great degree of flexibility is provided for in the shafting.

The distinctive feature of the invention resides in the fact that the rib 4 and the groove 5 of each link or unit 1 are not in parallel planes. On the contrary, they are set at different angles relative to the center line of the shafting whereby each hinge connection or hinge-joint may be said to pass through the center of the shafting at a different angle from the preceding hinge-joint. In other words, the angles of the series of hinged-joints are different and regularly spaced so that the said joints may be said to be arranged in spiral order throughout the length of the shafting thereby uniformly distributing the torsional strain imposed upon said line of joints, and greatly increasing the strength of the shafting. Of course, the degree of relative angularity of the line of hinge-joints may be varied to suit any required condition of work without affecting the fundamental feature involved in the spiral arrangement of the hinge-joints.

From the foregoing it is thought that the construction and many advantages of the herein described flexible shafting will be apparent without further description, and it will also be understood that various changes in the form, proportion and minor details of construction may be resorted to without departing from the spirit or sacrificing any of the advantages of the invention.

I claim:

1. A flexible shafting comprising a continuous series of links each provided at one side with a cylindrical groove and at the opposite side with a cylindrical knuckle rib, and a retaining device mounted in each link body and loosely interlocking with the rib fitting in the groove thereof.

2. A flexible shafting consisting of a continuous series of cylindrical links each provided upon opposite sides with double beveled clearance faces, each of said links being further provided at one side with a cylindrical hinge groove and at the opposite side with a cylindrical knuckle-rib provided therein with a keeper notch, and a retaining pin mounted in each link body and engaging the keeper notch of the rib interlocked in the groove thereof.

In testimony whereof I hereunto affix my signature in the presence of two witnesses.

EDGAR F. JOHNSTON.

Witnesses:
MARY E. DOUGHERTY,
JOHN A. ELLIOTT.